(12) United States Patent
Mayer et al.

(10) Patent No.: US 10,852,425 B2
(45) Date of Patent: Dec. 1, 2020

(54) RADAR SYSTEM HAVING A CENTRALLY CONFIGURED ANALYSIS UNIT

(71) Applicant: Robert Bosch GmbH, Stuttgart (DE)

(72) Inventors: Marcel Mayer, Lonsee (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 16/205,935

(22) Filed: Nov. 30, 2018

(65) Prior Publication Data

US 2019/0212437 A1  Jul. 11, 2019

(30) Foreign Application Priority Data

Jan. 11, 2018 (DE) .................. 10 2018 200 391

(51) Int. Cl.

| | |
|---|---|
| *G01S 13/931* | (2020.01) |
| *G01S 13/87* | (2006.01) |
| *G06F 13/38* | (2006.01) |
| *B60Q 1/00* | (2006.01) |
| *H01Q 1/32* | (2006.01) |
| *G01S 13/34* | (2006.01) |

(52) U.S. Cl.
CPC .......... *G01S 13/931* (2013.01); *B60Q 1/0023* (2013.01); *G01S 13/87* (2013.01); *G06F 13/38* (2013.01); *H01Q 1/325* (2013.01); *H01Q 1/3233* (2013.01); *G01S 13/343* (2013.01)

(58) Field of Classification Search
CPC combination set(s) only.
See application file for complete search history.

(56) References Cited

U.S. PATENT DOCUMENTS

| | | | |
|---|---|---|---|
| 2014/0333469 A1* | 11/2014 | Nagy ...................... | G01S 7/41 342/59 |
| 2017/0075352 A1* | 3/2017 | Nordbruch ............ | B60W 30/09 |
| 2017/0101131 A1* | 4/2017 | Zegelaar ............ | B62D 15/0265 |
| 2018/0065623 A1* | 3/2018 | Wodrich ............... | B60W 30/06 |
| 2019/0007010 A1* | 1/2019 | Hoyerby ................ | H03F 1/523 |
| 2020/0088840 A1* | 3/2020 | Stokes .................... | G01S 13/42 |

* cited by examiner

*Primary Examiner* — Mamadou L Diallo
(74) *Attorney, Agent, or Firm* — Norton Rose Fulbright US LLP; Gerard Messina

(57) ABSTRACT

A radar system for a vehicle, having at least one central control unit for sending data and for processing received data, at least one radar sensor head that is situated at a distance from the at least one central control unit and that has at least one transmit antenna for producing radar waves and at least one receive antenna for receiving radar waves, and having at least one data line between the at least one central control unit and the at least one radar sensor head, the at least one radar sensor head having an analog-digital converter for converting radar waves received by the at least one receive antenna into digital measurement data, and the external control unit having at least one analysis unit connected downstream from a data line for carrying out a processing step over at least a part of the digital measurement data.

10 Claims, 1 Drawing Sheet

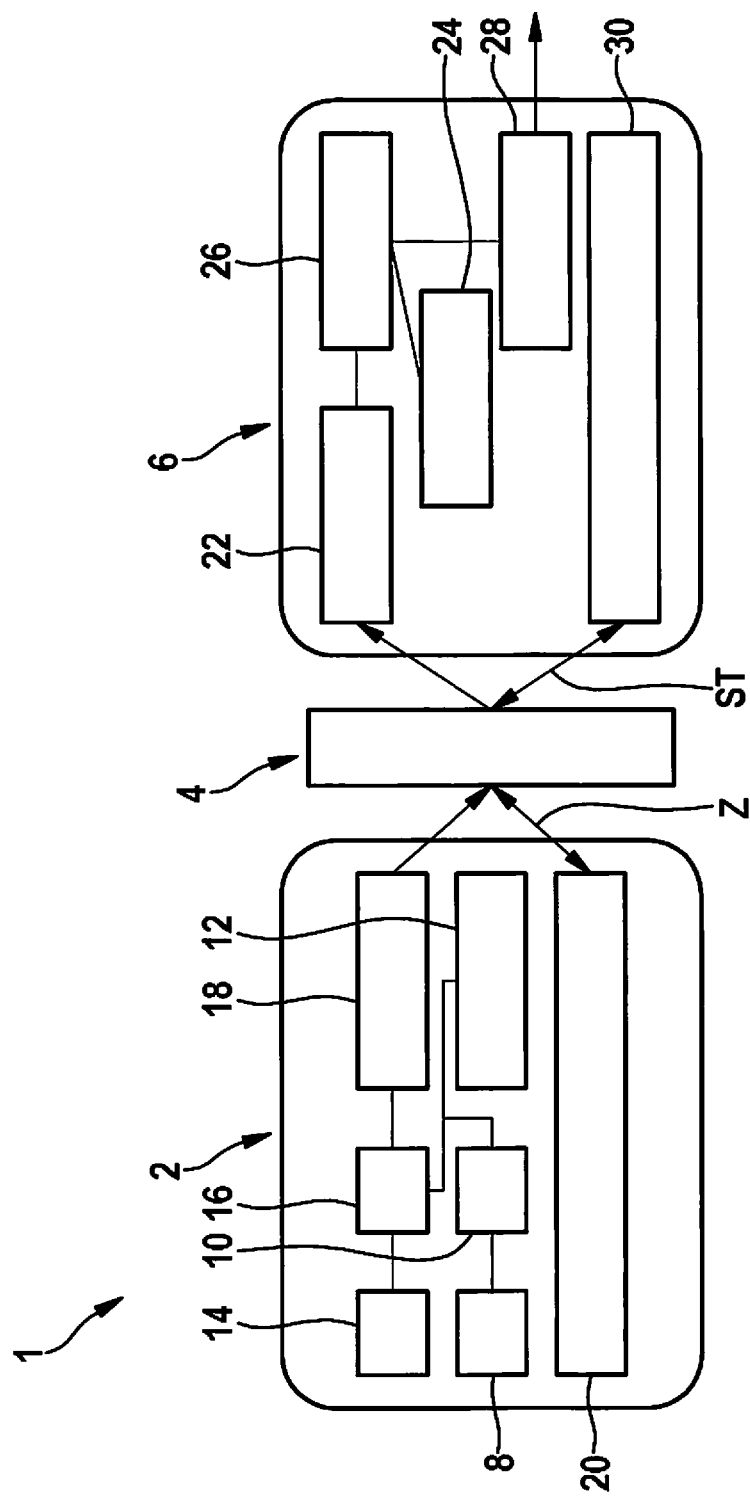

RADAR SYSTEM HAVING A CENTRALLY CONFIGURED ANALYSIS UNIT

CROSS REFERENCE

The present application claims the benefit under 35 U.S.C. § 119 of German Patent Application No. DE 102018200391.2 filed on Jan. 11, 2018, which is expressly incorporated herein by reference in its entirety.

FIELD

The present invention relates to a radar system for a vehicle, having a central control unit for sending data and for processing received data, at least one radar sensor head that is situated at a distance from the central control unit and that has at least one transmit antenna for producing radar waves and at least one receive antenna for receiving radar waves, and having at least one data line between the central control unit and the at least one radar sensor head.

BACKGROUND INFORMATION

Increasingly, radar sensors are being installed in vehicles that have a high level of driver assistance functions or automated driving functions. A higher number of radar sensors is intended to achieve a higher level of performance of functions in the automated or partly automated case, compared to individual radar sensors. Previous solutions in this area have consisted of radar sensors that carry out, internal to the sensor, extensive data processing of the received radar waves. In this way, the radar sensors can provide data at the object or location level for further evaluation by the vehicle. In this way, the quantity of data transmitted to the vehicle can be reduced, but each of the radar sensors has to have a higher degree of computing power and a larger memory.

Here it is disadvantageous that the computing power and memory size scale relatively poorly with regard to increased performance. This is due in particular to the fact that, based on a defined demand made on performance, the microcontroller technology for the required processing steps for the received radar waves may no longer be adequate. Therefore, in order to increase the performance, the necessary calculations and analyses have to be carried out inside the sensor, using microprocessor technologies. This can have a disadvantageous effect on the price, size, and power losses of a radar sensor or radar system having a plurality of radar sensors.

SUMMARY

An object of the present invention is to provide a radar system for vehicles that is scalable in an economical and flexible fashion with regard to the number of radar sensors used and the performance level of the radar system.

This object may be achieved in accordance with the present invention. Advantageous embodiments of the present invention are described herein.

According to an aspect of the present invention, a radar system for a vehicle is provided. The radar system has at least one central control unit for sending data and for processing received data. In addition, the radar system has at least one radar sensor head that is situated at a distance from the central control unit and that has at least one transmit antenna for producing radar waves and at least one receive antenna for receiving radar waves. For the transmission of data, the radar system has at least one data line between the at least one central control unit and the at least one radar sensor head. According to the present invention, the at least one radar sensor head has an analog-digital converter for converting radar waves received by the at least one receive antenna into digital measurement data, the external control unit having an analysis unit, connected downstream from the at least one data line, for carrying out a processing step over at least a part of the digital measurement data.

Currently used radar sensors are often realized as fast-chirp radar units. This means that many fast FMCW (frequency-modulated continuous wave) ramps are sent in a sampling region, which is also designated a so-called chirp sequence or rapid chirp method. After the mixing of the received radar signals, the baseband signals are filtered, digitized, and supplied together to a 2-D Fourier transformation. Because a subsequent Doppler FFT (fast Fourier transformation) cannot take place until the data, or measurement signals, of all ramps or frequencies have been processed, a large memory is necessary in order to buffer the received radar signals. In addition, due to the high latency requirement, there is a need for high computing power, for which reason hardware accelerators are standardly used.

With the use of a plurality of radar sensors in a vehicle, it is advantageous to concentrate the required computing power in at least one central control device. In this way, the respective radar sensors can be realized as compact and low-cost radar sensor heads without significant power loss. In this way, overall a better price-performance ratio can be achieved, and a higher performance level of the radar system can be realized.

In the radar system according to the present invention the at least one radar sensor head has components for producing and sending radar waves, and components for receiving and processing received radar waves. The processing of the received radar waves is here limited to the smallest degree possible, or takes place with as low an outlay as possible. In particular, the measurement data of the received radar waves can be digitized by the analog-digital converter and then transmitted to the at least one central control device with a high bandwidth. The further processing of the digitized measurement data by the at least one radar sensor head can then take place in the at least one central control device.

In this way, the costs for each of the radar sensor heads can be minimized, because computing operations or processing steps carried out in the radar sensor heads can be reduced to a minimum level. In addition, a lower power loss can be incurred in each of the radar sensor heads due to the smaller number of processing steps. While the computing outlay in the at least one central control unit does increase, here the computing power, compared to the incurred costs, can be scaled more easily or with a lower outlay. Considering the radar system overall, the radar system according to the present invention can be expanded and scaled at low cost and flexibly compared to previous solutions. In addition, due to the higher computing power of the at least one central control unit, more complex and more powerful algorithms can be used to process the received radar waves. This results in greater flexibility in the design and performance of the at least one central control unit. As a result, more extensive possibilities are provided for the signal processing in the at least one central control unit. In particular, algorithms for processing the measurement data can be used that differ from the standard 2-D frequency transformation of the received measurement data.

The radar system according to the present invention is explained as an example with reference to a chirp sequence radar, but is also applicable to other types of radar or types of modulation. Alternative radar methods may include for example slow FMCW radars not having subsequent Doppler FFT, PN radars having an analysis unit as a correlator bank, or an OFDM radar having an analysis unit for carrying out a spectral division.

According to an exemplary embodiment of the radar system, the analysis unit, connected downstream from the at least one data line, can carry out a Fourier transformation and/or an orthogonal frequency-division multiplexing method and/or at least one correlator. In this way, the sampling values or received radar waves, after digitization, are transmitted directly to the at least one central control unit and are then subjected to further processing steps in the at least one central control unit. The fast Fourier transformation can for example be a range FFT that can be adapted to the particular intended application. For example, the fast Fourier transformation can be made capable of being carried out only up to the anti-aliasing filter limit. In this way, the computing outlay in the central control unit can be reduced.

According to another exemplary embodiment of the radar system, the digital measurement data are capable of being marked with at least one item of time information in the at least one radar sensor head. In this way, the received radar waves or measurement data can be provided with a timestamp after conversion to a digital format. Here, for example each recorded spectrum can be given a separate timestamp. The digital measurement data provided with an item of time information here create the possibility of synchronizing the oscillators of the radar sensor heads with one another and realizing safety functions. For example, the running, or operation, of the at least one radar sensor head can be monitored. In this way, for example frequency deviations of each of the oscillators can be recognized and for example subsequently compensated during further processing in the at least one central control unit.

According to a further exemplary embodiment of the radar system, the digital measurement data produced by the analog-digital converter can be communicated in packets to the at least one central control unit through the at least one data line. It is advantageous for the digital measurement data to be tailored already in the at least one radar sensor head so as to adapt them to the further processing in the at least one central control unit. For example, the digital measurement data can be adapted to the sampled values used for a frequency ramp, and can be sent in bundled fashion through the at least one data line. For example, 512 sampled values can be required for a frequency ramp, so that the corresponding digital measurement data of these 512 sampled values are transmitted in bundled fashion. This can also be carried out even if no buffering takes place of the received radar waves or of the digital measurement data.

According to a further exemplary embodiment of the radar system, the digital measurement data can be transmitted to the at least one central control unit through the at least one data line, and, in the central control unit, can be synchronized with the at least one radar sensor head using the at least one item of time information. A defined buffering of the occurrent set of data can take place through the first processing of the received measurement data in the radar sensor head. The deviations resulting from this between the at least one radar sensor head and the at least one central control unit can be compensated based on the assigned item of time information. The items of time information can preferably be realized in the form of a timestamp or a plurality of timestamps. In this way, the timestamps can be used for a temporal synchronization of the measurement data between the at least one radar sensor head and the at least one central control unit. In this way, measurement data transmitted with a delay to the at least one central control unit can also be correctly temporally sorted and used for further applications or calculations. In this way, the temporal differences resulting from the transmission of the digital measurement data can also be compensated in the at least one central control unit.

According to a further exemplary embodiment of the radar system, the at least one item of time information can be produced by a time and control device situated in the at least one radar sensor head. The at least one radar sensor head can thus have an additional circuit configured parallel to the analysis unit. The time and control device can receive and implement control commands from the at least one central control unit, for example transmitted via the at least one data connection, and can provide the digitized measurement data with precise items of time information. In addition, the time and control device can be used for a controlling of the at least one radar sensor head, as well as for example for monitoring control or cycle controlling. In order to enable a temporal synchronization of each of the components in the radar system to take place, the time and control device must add for example timestamps to the transmitted measurement data for each transmitted chirp, frequency ramp, or cycle, so that the at least one central control unit can make appropriate use of the transmitted measurement data.

According to a further exemplary embodiment of the radar system, the at least one transmit antenna of the at least one radar sensor head has a frequency synthesizer for producing a carrier frequency. Here, the frequency synthesizer can be adjusted by the central control unit through the time and control device. By implementing the time and control device in the at least one radar sensor head, an influencing of the components of the at least one radar sensor head by the at least one central control unit can be realized. In this way, the frequency synthesizer of the at least one radar sensor head can be controlled or regulated directly or indirectly. In particular, frequency deviations of the frequency synthesizers of different radar sensor heads can be recognized and compensated by the at least one central control unit. For example, via control commands the frequency synthesizers of the respective radar sensor heads can be directly or indirectly influenced, or the frequency deviation can be subsequently compensated during further processing of the digital measurement data.

According to a further exemplary embodiment of the radar system, frequency synthesizers of at least two radar sensor heads can be synchronized with one another by the at least one central control unit. In a vehicle, a plurality of radar sensor heads can be installed situated at a distance from one another, and connected to one or more central control units in data-conducting fashion via data connections. Through the implemented time and control devices in the various radar sensor heads, given use of a plurality of radar sensor heads the respective oscillators or frequency synthesizers of the at least one transmit antenna(s) can be synchronized with one another. In this way, the precision of the measurement results of the radar system can be increased. As a result, the driver assistance functions or the automated driving functions of the vehicle can be optimized. In addition, the number of radar sensor heads used can be significantly increased without negatively influencing the performance level of the radar system.

According to a further exemplary embodiment of the radar system, the data transmitted through the at least one data line can be transmitted with a higher data rate than a reference frequency of the at least one transmit antenna of the at least one radar sensor head. To enable optimal operation of the time and control device for controlling or regulating the at least one radar sensor head, the transmission of the data through the at least one data line must take place with a higher time resolution than the radar operation. In this way, further functions, such as safety functions for monitoring frequency deviations of various oscillators or frequency synthesizers, can be integrated into the radar system according to the present invention. The higher time resolution for the data transmission can be easily realized in MMIC (monolithic microwave integrated circuit) technology, because this technology enables frequencies of several gigahertz. Thus, a timestamp can be easily transmitted for example with 1 GHz and a temporal resolution of 1 ns. The internal reference frequency can be for example 50 MHz for a PLL reference of the at least one transmit antenna; as a result, the data rate according to the example has to be greater than 50 Mbit/s.

According to a further exemplary embodiment of the radar system, the at least one central control unit has at least one processor for carrying out computing operations, the analysis unit for transforming digital measurement data, at least one memory for the at least temporary storage of digital data, and a time and control device for synchronizing the digital measurement data. Via the time and control device, situated in the at least one central control unit, the radar sensor heads can be controlled or influenced using control commands. The analysis unit can preferably be implemented for carrying out a range FFT in the central control unit. In this way, the at least one central control unit can process the digital measurement data, transmitted through the at least one data line, of at least one radar sensor head and can store these data at least temporarily. In accordance with the requirements of the particular application, the processed data may be processed, forwarded, or outputted. As needed, for example during an update, the at least one central control unit can be exchanged for a more powerful control unit. Because microprocessor technology may already be used here, an application of more sophisticated algorithms for processing the measurement data in order to achieve more precise calculation results, or to accelerate the processing of the measurement data, is possible.

Below, a preferred exemplary embodiment of the present invention is explained in more detail on the basis of a greatly simplified schematic representation.

BRIEF DESCRIPTION OF THE DRAWINGS

FIG. 1 shows a first example embodiment of the present invention.

DETAILED DESCRIPTION OF EXAMPLE EMBODIMENTS

FIG. 1 shows a schematic representation of a radar system 1 according to a first specific embodiment of the present invention. Radar system 1 is made up of a radar sensor head 2 that is coupled to a central control unit 6 via a data line 4. For simplicity, one radar sensor head 2 and one data line 4 are shown. Radar system 1 can also have a plurality of radar sensor heads 2 and data lines 4.

Radar sensor 2 has for example a transmit antenna 8 that can be operated via an antenna control unit 10. Antenna control unit 10 is coupled to a frequency synthesizer 12 in order to produce a constant or variable carrier frequency of the radar waves for supplying transmit antenna 8.

In addition, radar sensor head 2 has, as an example, a receive antenna 14 having a corresponding evaluation unit 16 for receiving radar waves. Radar sensor head 2 here can have a plurality of transmit antennas 8 and/or receive antennas 14. The received radar waves can be converted into digital measurement data by an analog-digital converter 18. The digital measurement data can subsequently be transmitted to central control unit 6 via a broadband data line 4. A timestamp Z is assigned to the transmitted digital measurement data by a time and control device 20 situated in radar sensor head 2. Timestamp Z is also transmitted to central control unit 6 via data line 4.

Central control unit 6 can receive and further process the transmitted digital measurement data. These data can be precisely temporally sorted using the timestamps transmitted with the measurement data. In central control unit 6, the digital measurement data are transformed by an analysis unit 22, in a first processing step. In addition, central control unit 6 has at least one processor 24 for carrying out computing operations, and a memory 26 for storing digital data. Here, processor 24 can alternatively or in addition be realized as an integrated circuit or a microcontroller. The digital measurement data processed by analysis unit 22 can for example be buffered in memory 26. Subsequently, the buffered measurement data can be further processed or evaluated by a signal processing unit 28, and for example forwarded for display. Central control unit 6 has a time and control device 30 that can communicate with time and control device 20 of radar sensor head 2 via data line 4. Time and control device 30 can for example be controllable by processor 24, and can produce control commands for influencing radar sensor head 2 via time and control device 20 of radar sensor head 2.

What is claimed is:

1. A radar system for a vehicle, comprising:
   at least one central control unit for sending data and for processing received data;
   at least one radar sensor head that is situated at a distance from the at least one central control unit and that has at least one transmit antenna for producing radar waves and at least one receive antenna for receiving radar waves; and
   at least one data line between the at least one central control unit and the at least one radar sensor head;
   wherein the at least one radar sensor head has an analog-digital converter for converting the radar waves received by the at least one receive antenna into digital measurement data, the at least one central control unit having an analysis unit, connected downstream from the at least one data line, for carrying out a processing step over at least a part of the digital measurement data.

2. The radar system as recited in claim 1, wherein the at least one analysis unit is configured to carry out a Fourier transformation and/or an orthogonal frequency-division multiplexing method, and/or at least one correlation, being capable of being carried out by the at least one analysis unit connected downstream from the at least one data line.

3. The radar system as recited in claim 1, wherein the digital measurement data is marked with at least one item of time information in the at least one radar sensor head.

4. The radar system as recited in claim 1, wherein the digital measurement data produced by the analog-digital converter is transmitted in packets to the at least one central control unit through the at least one data line.

5. The radar system as recited in claim 3, wherein the digital measurement data is transmitted to the at least one central control unit through the at least one data line, and is synchronized with the at least one radar sensor head in the at least one central control unit through the at least one item of time information.

6. The radar system as recited in claim 3, wherein the at least one item of time information is produced by a time and control device situated in the at least one radar sensor head.

7. The radar system as recited in claim 6, wherein the at least one radar sensor head has a frequency synthesizer for producing a carrier frequency of the at least one transmit antenna, and the frequency synthesizer is adjusted by the at least one central control unit through the time and control device.

8. The radar system as recited in claim 1, wherein respective frequency synthesizers of at least two radar sensor heads of the at least one radar sensor head are synchronized with one another through the at least one central control unit.

9. The radar system as recited in claim 1, wherein the data transmitted through the at least one data line is transmitted with a higher data rate than a reference frequency of the at least one transmit antenna of the at least one radar sensor head.

10. The radar system as recited in claim 1, wherein the at least one central control unit has at least one processor for carrying out computing operations, the analysis unit for transforming digital measurement data, at least one memory for at least temporary storage of digital data, and a time and control device for synchronizing the digital measurement data.

* * * * *